United States Patent
Xiao et al.

(10) Patent No.: US 7,408,880 B2
(45) Date of Patent: Aug. 5, 2008

(54) METHOD FOR CONTROLLING TRANSMISSION RATE IN COMMUNICATION SYSTEM AND APPARATUS THEREOF

(75) Inventors: Youqian Xiao, Guangdong (CN); Zhongji Hu, Guangdong (CN); Xueming Wang, Guangdong (CN); Yanmin Tan, Guangdong (CN)

(73) Assignee: Huawei Technologies Co., Ltd. (CN)

( * ) Notice: Subject to any disclaimer, the term of this patent is extended or adjusted under 35 U.S.C. 154(b) by 754 days.

(21) Appl. No.: 10/491,315

(22) PCT Filed: Feb. 8, 2002

(86) PCT No.: PCT/CN02/00071
§ 371 (c)(1),
(2), (4) Date: Jul. 15, 2004

(87) PCT Pub. No.: WO03/030569
PCT Pub. Date: Apr. 10, 2003

(65) Prior Publication Data
US 2004/0242256 A1 Dec. 2, 2004

(30) Foreign Application Priority Data
Sep. 28, 2001 (CN) ................................ 01 1 26905

(51) Int. Cl.
*H04B 7/216* (2006.01)

(52) U.S. Cl. .................. 370/235; 370/335; 455/522
(58) Field of Classification Search ................ 370/235, 370/331, 332, 335, 342
See application file for complete search history.

(56) References Cited

U.S. PATENT DOCUMENTS

| 6,198,911 | B1 |  | 3/2001  | Lea et al. |
| 6,208,873 | B1 |  | 3/2001  | Black et al. |
| 6,370,359 | B1 |  | 4/2002  | Ue et al. |
| 6,381,445 | B1 |  | 4/2002  | Ue et al. |
| 6,400,929 | B1 |  | 6/2002  | Ue et al. |
| 6,597,894 | B1 |  | 7/2003  | Ue et al. |
| 6,760,596 | B1 | * | 7/2004  | Fiorini et al. ............. 455/522 |
| 6,801,511 | B2 | * | 10/2004 | Park ........................ 370/331 |
| 2006/0019610 | A1 | * | 1/2006 | Ue et al. ..................... 455/69 |

* cited by examiner

*Primary Examiner*—Brian D Nguyen

(57) ABSTRACT

Disclosed is a method for controlling uplink and/or downlink transmission rate between a mobile station and a base station according to transmission power of the mobile station/base station in a communication system. First, a transmission power measurement device measures transmission power of the mobile station/base station. Then, the transmission power measurement device compares the measured transmission power with predefined thresholds to determine whether an event happens. At last, if an event happens, a rate adjustment controller sends a rate adjustment demand according to type of the event to adjust the uplink and/or downlink transmission rate.

24 Claims, 5 Drawing Sheets

METHOD FOR CONTROLLING TRANSMISSION RATE IN COMMUNICATION SYSTEM AND APPARATUS THEREOF

CROSS REFERENCE TO RELATED APPLICATIONS

This application is a 371 of PCT/CN02/00071, filed on Feb. 8, 2002.

FIELD OF THE TECHNOLOGY

The invention relates to a method for controlling transmission rate in a communication system such as Code Division Multiple Access (CDMA) system and apparatus thereof, and specifically to a method for controlling transmission rate on the uplink (from a mobile station to a base station) and downlink (from a base station to a mobile station) between a mobile station and a base station according to transmission power of a base/mobile station and apparatus thereof.

BACKGROUND OF THE INVENTION

CDMA is a kind of modulation and multiple-access connection technology based on spread spectrum communication. In the spread spectrum communication technology, a digital signal is multiplied by a pseudo random code with high bit rate at the signal transmitting end. Since bit rate of the pseudo random code is much higher than that of the digital signal, the signal transmission bandwidth is spread. At the receiving end, the received signal is multiplied by the same pseudo random sequence to make the correlation operation and the spread signal is de-spread.

Nevertheless, in CDMA system, the pseudo random codes are not orthogonal perfectly, and this causes mutual interference among different channels and among different subscribers. Since CDMA system is a self-interference system, in order to prevent near-far effect from appearing and signal-to-interference ratio (SIR) from being changed, an inner loop power control method and an outer loop power control method are simultaneously employed for uplink and downlink. The result of power control is that the amount of transmission power reflects the condition of connection between system and service, such as a cell load, a channel condition and path loss of the propagation environment etc.

When the propagation condition is changed, for example air interface interference is increased, or a subscriber is at the cell boundary that is farther apart from the base station and the path loss is increased, in order to make the signal at receiving end have a certain SIR, the transmission power allocated to each subscriber needs to be increased. This causes the transmission power of mobile station and base station to be increased too. Increase of transmission power will increase air interface interference, and more interference on air interface will need more transmission power. This is a positive feedback procedure, and the transmission power is getting higher and higher. When the system load has reached a certain degree, this positive feedback will make the transmission power increase rapidly at the mobile station and the base station, and finally the system load will reach near the saturation state.

In general, during the procedure of establishing or re-configuring channel, the system allocates a transmission power range, which corresponds to the resource allocated to the link, to the mobile station. This is an admission control for a service request before a channel has been established. Therefore, it is considered that the system does not crush when transmission power is within the configured range. In contrast, when the system load is near the saturation state, it is possible that the transmission power of a channel is out of the configured range; in this case, it is necessary to have a negative feedback control mechanism to reduce the system transmission power to compensate the positive feedback of increasing power. In this invention, provides a method that decreases a channel transmission power to reduce the system load, and reducing the channel rate within the QoS allowable range.

When cell load increases or channel condition becomes worse, usually QoS for a subscriber with high service rate is decreased more rapidly than that for a subscriber with low service rate; this is another reason to decrease the service rate in this situation. This situation may be explained with an example of an Adaptive Multi-Rate (AMR) voice service. FIG. 5 shows the Mean Opinion Score (MOS) to Carrier to Interference (C/I) curves for different AMR modes. It can be seen from FIG. 5 that when the C/I becomes smaller, i.e. the cell load becomes heavier, the channel condition becomes worse and the mobile station goes farther from the base station, the MOS of a higher rate AMR mode decreases more rapidly than that of a lower rate AMR mode. This means that a lower rate service will have better QoS than a higher rate service. If the rate remains unchanged, QoS for subscribers will decrease rapidly. Therefore, in this case, decreasing the rate will improve the QoS relatively.

In contrast, when cell load becomes lighter, QoS for a subscriber with a higher service rate is increased more rapidly than that for a subscriber with a lower service rate. In a condition that cell load becomes heavier, decreasing service rate in a certain range can slow the decreasing rate of QoS, but the QoS has been decreased already. When resource is available, increasing service rate can increase QoS; so we should transmit the voice and data with the as rapid rate as possible. When system load becomes lighter, it is necessary to increase rate appropriately so as to provide better QoS.

The U.S. patent named "Code division multiple access system providing load and interference based demand assignment service to users" (U.S. Pat. No. 6,088,335) discloses a method for allocating rate. The invention has the following features. At first, the rate to be increased is decided according to pilot signals. Secondly, the rate is decided according to the difference between the maximum pilot signal in active set and that in non-active set. Thirdly, a series of threshold levels are set and each threshold level corresponds to a rate. At last, another method is provided, in this method, the rate is decided according to the average capacity load of adjacent cells and the signal strength of received pilot signals. There are several problems in the technical scheme disclosed in the U.S. patent. First, the pilot data do not directly reflect change of service rate; it is difficult to response the effect of rate adjustment rapidly. Secondly, with this method the uplink rate and downlink rate cannot be controlled separately because the pilot data only reflect the downlink load condition. In CDMA system, uplink service and downlink service is unsymmetrical, and it cannot satisfy service requirement if uplink rate and downlink rate cannot be controlled separately. Furthermore, it is impossible to deal with the situation that uplink rate and downlink rate need to be adjusted in different direction, such as one should be increased and another should be decreased.

SUMMARY OF THE INVENTION

An object of the invention is to provide a method that independently controls the uplink and downlink transmission rate between a mobile station and a base station in a communication system according to the transmission power of the mobile station and the base station so as to improve QoS and apparatus thereof.

A method for control transmission rate according to the invention includes the steps of: a transmission power measurement device in the mobile station and/or the base station measuring the transmission power, comparing the measured transmission power with predefined thresholds to determine whether an event happens; if an event happens, reporting an event type to rate adjustment controller at the network side, wherein the event type indicates that the measured transmission power exceeds at least one threshold or falls below at least one threshold; sending, by the rate adjustment controller, a rate adjustment demand according to the event type: and starting, by the rate adjustment controller, a timer in the rate adjustment controller;

receiving, by the mobile station and/or the base station, the rate adjustment demand and adjusting the transmission rate, wherein if the mobile station adjusts the transmission rate, the transmission rate adjusted by the mobile station is the unlink transmission rate, and if the base station adjusts the transmission rate, the transmission rate adjusted by the base station is the downlink transmission rate; and sending, by the rate adjustment controller, another rate adjustment demand to the mobile station and/or base station if the timer expires and no other event type is reported.

An apparatus for controlling transmission rate according to the invention includes a transmission power measurement device in the mobile station and/or base station, used for measuring transmission power of the mobile station/base station and comparing the measured transmission power with predefined thresholds to determine whether an event happens, if an event happens, reporting an event type which indicates that the measured transmission power exceeds at least one threshold or falls below at least one threshold; and a rate adjustment controller in the network side, for receiving the event type from the transmission power measurement device and sending a rate adjustment demands to the mobile station and/or base station according to the event type to adjust the uplink and/or downlink transmission rate; wherein the rate adjustment controller further comprises a timer; and the rate adjustment controller is further configured to send another rate adjustment demand to the mobile station and/or base station if the timer expires and no other event type is reported.

A transmission power directly reflects the cell load, channel condition and distance between a mobile station and a base station. When a transmission power is greater than the highest threshold, it shows that the cell load is too heavy, the channel condition is too bad and the mobile station is at the cell boundary; it is necessary to decrease the rate to retard the QoS going worse quickly. When a transmission power is less than the lowest threshold, it shows that the cell load is too light, the channel condition is good and the distance between the mobile and base stations is not too far; it is necessary to increase the rate to raise the QoS. It can be seen that by means of adjusting rate via adjustment of transmission power, the QoS can be improved, and the uplink and the downlink can be operated independently. Namely, the lower the transmission power is, the lower rate is. So, the method and the apparatus according to the invention also can restrain the phenomena that the transmission power increases too rapidly.

DETAILED DESCRIPTION OF THE INVENTION

The invention will be described in more detail hereinafter with reference to FIG. 1-4 and embodiments. The features and advantages of the invention will be apparent from the following detailed description for those who skilled in the art.

Figure 1:
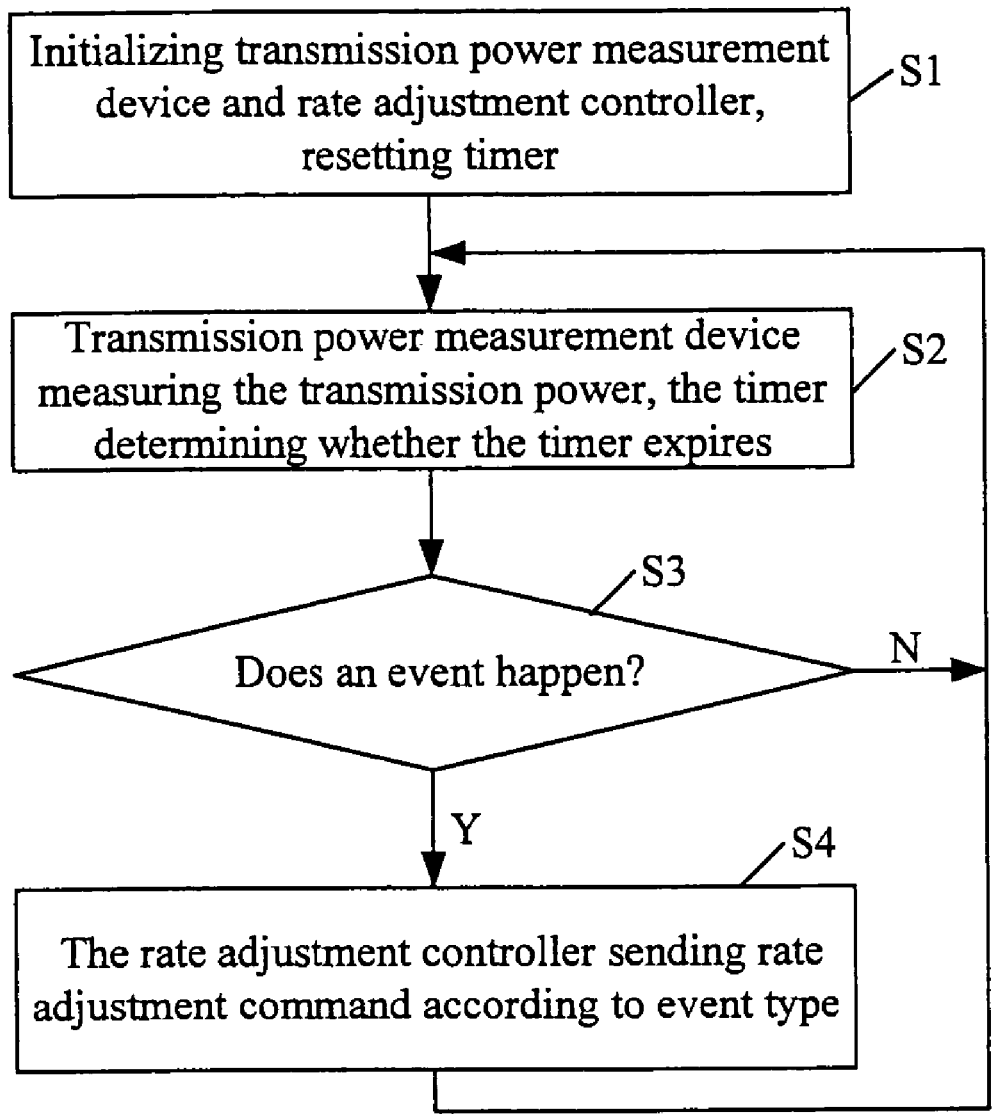
FIG. 1 is a general flowchart of the method according to the invention illustrating the procedure of rate adjustment.

FIG. 1 shows the whole flowchart for rate adjustment of the invention. For clearness, an adjustment method and apparatus for the uplink transmission rate from a mobile station to a base station will be taken as an example, but it can be understood that the method and the apparatus according to the invention are suitable for the rate adjustment of downlink transmission also.

As shown in FIG. 1, at first, a transmission power measurement device in a mobile station and a rate adjustment controller in a base station controller are initiated, meanwhile a timer is reset; wherein the rate adjustment controller is initialized to the normal state (S1). In step S2, the transmission power measurement device measures the transmission power of the mobile station. Then, the transmission power measurement device compares the measured transmission power with predefined thresholds to determine whether an event happens (S3).

Figure 2:
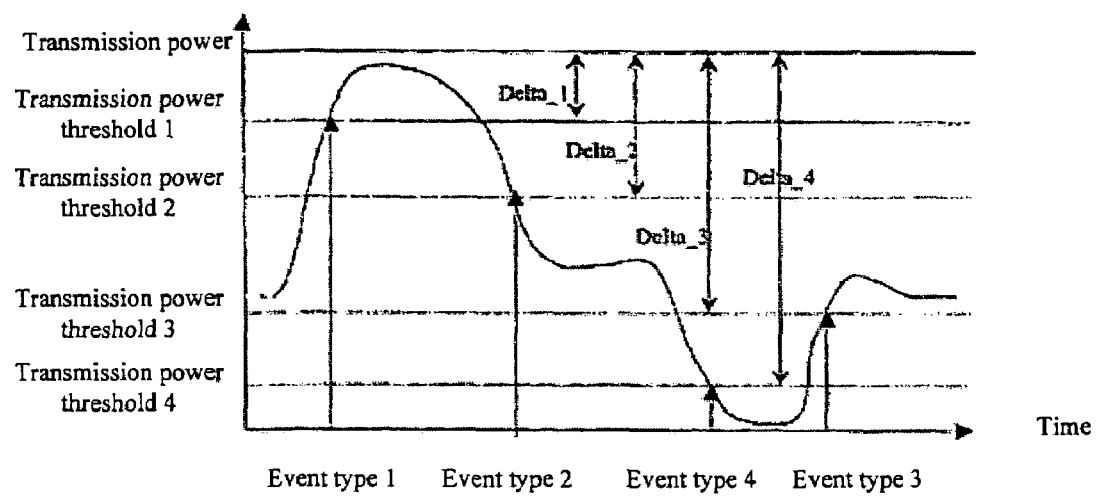
FIG. 2 shows the types of events triggered when the transmission power goes through four thresholds according to the invention.

FIG. 2 shows how to determine an event type. In this preferred embodiment, four transmission power thresholds are predefined. The transmission power threshold 1 shows that the cell load is very heavy, the path condition is very bad and the mobile station is at the cell boundary; when the transmission power measured by the transmission power measurement device goes through the threshold 1 upwards, it is determined that the event type 1 happens. The transmission power thresholds 2 and 3 show that the cell load is normal, the path condition is normal and the distance between the mobile station and the base station is normal too; when the transmission power goes through the threshold 2 downwards or goes through the threshold 3 upwards, the event type 2 and event type 3 are triggered respectively. The transmission power threshold 4 shows that the cell load is too light, the path condition is very good and the mobile station is near the base station; when the transmission power goes through the threshold 4 downwards, the event type 4 is triggered.

Figure 3:
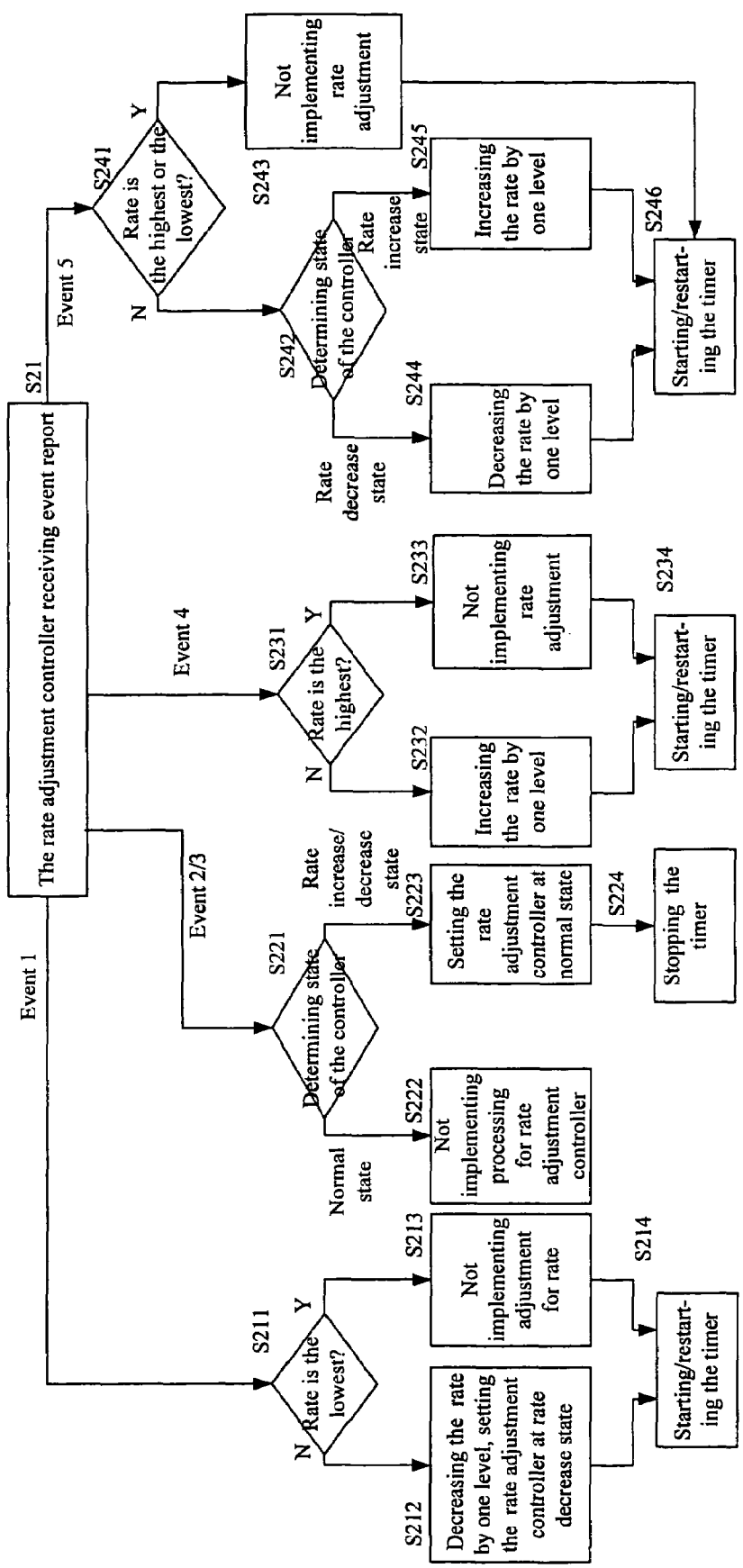
FIG. 3 shows a flowchart of rate adjustment implemented by the rate adjustment controller in a four thresholds condition.

Referring to FIG. 1 again, the method for rate adjustment in this invention will be explained. When the transmission power measurement device determines that an event happens, it sends a measurement report including the event type to the rate adjustment controller in the base station controller immediately. Next, the rate adjustment controller sends a rate adjustment demand to the mobile station according to the event type which is shown in FIG. 3. It should be noted that step S2 of FIG. 1 includes a step of determining whether a timer expires. If so, it is determined that the event type 5 is triggered. In such case, the rate adjustment controller will implement the rate adjustment control and the timer adjustment according to the event type (as shown in step S4 of FIG. 1).

FIG. 3 shows a flowchart of rate adjustment implemented by the rate adjustment controller in a four thresholds condition.

First, the rate adjustment controller receives an event report including the event type (S21). When event type 1 happens, it shows that the transmission power has passed the threshold 1 from a lower value to a higher value; in this case, it is needed to decrease the rate level to retard the QoS getting worse and to suppress the transmission power getting higher. In step S211, the rate adjustment controller determines whether the uplink rate is at the lowest level; if so, there is no further processing (S213), and then the timer in the rate adjustment controller is started/restarted (S214). The timer starts timing. When the set time of the timer elapses, event type 5 happens; the rate adjustment controller determines whether the uplink rate is at the lowest level (S241), if so, there is no further processing (S243), and then the timer is started/restarted (S246). It is seen that when the transmission power has passed the threshold 1 and the rate is at the lowest level, the timer traces the situation in which the rate is at the lowest level but the transmission power is too high.

Returning to step S211, when it is determined that the rate is not at the lowest level, the rate adjustment controller sends a rate decrease demand; and then the mobile station will decrease the rate one level lower and the rate adjustment controller is at the rate decrease state (S212). Next, the timer is started/restarted (S214). When the set time of the timer elapses and the measurement report has not been sent from the transmission power measurement device, i.e. the event type 5 happens, it means that the last adjustment of the rate is not enough and a further decrease of the rate is needed. In this case, first whether the rate is at the lowest level is determined by the rate adjustment controller (S241), if so, there is no further processing (S243) and the timer is started/restarted (S246) to trace the situation in which the rate is at the lowest level and the transmission power remains too high. When the rate is not at the lowest level, which means the rate adjustment can be implemented, the current state of the date rate adjustment controller will be determined. Since the rate adjustment controller has been set at the rate decrease state at step S212, so at step S242, it is determined that the rate adjustment controller is at the rate decrease state, and then at step S244, the rate is further decreased one level lower. Later, the timer is started/restarted at step S246. When the set time of the timer elapses once again and no other event happens, it shows that the rate needs to be further decreased, and then the procedure mentioned above is repeated.

During the set time, when the transmission power is decreased due to the decrease of the transmission rate, and passed the threshold 2 from a higher value to a lower value so that event 2 happens; it shows that the cell load situation is being improved forward to the normal state, so no more adjustment is needed. In this case, the rate adjustment controller determines state of itself (S221). If the rate adjustment controller is at the rate decrease state, it is set to the normal state (S223) and the timer is shut (S224). If it is determined that rate adjustment controller is at the normal state, it is unnecessary to do anything for the rate adjustment controller (S222).

When the cell load, path condition and distance from the mobile station to the base station are improved to a much better condition, it is hoped that the transmission rate will be increased to provide better QoS. In this case, the transmission power passes the threshold 4 from a higher value to a lower value, i.e. event type 4 happens; the rate adjustment controller determines whether the rate is at the highest rate (S231). If the rate is at the highest rate, it is impossible to increase the rate, so the rate adjustment controller does nothing (S233), and then the timer is started/restarted (S234). Later, if the set time elapses, event type 5 is triggered, and the rate adjustment controller will determines whether the rate is at the highest level (S241). If the rate is still at the highest level, no any further processes will be done (S243) and the timer will be started/restarted (S246) to trace the situation in which the rate is at highest level but the transmission power is too low.

Returning to step S231, when it is determined that the rate is not at the highest rate, that is, the rate is adjustable, so the rate adjustment controller sends an rate increase demand to the mobile station to raise one level higher of its transmitting rate (S232) and start/restart the timer (S234). If the set time elapses but no other event happens, then event type 5 is triggered. This means that although the rate has been raised one level higher, the transmission power has not reached the normal state and the rate needs to be raised further. At this moment, the rate adjustment controller determines whether the rate is at the highest level (S241), if it is not at the highest level, then the state of the rate adjustment controller is determined (S242). If the rate adjustment controller is at a rate increase state, the rate is raised one level higher (S245) and the timer is started/restarted (S246). Later, if the set time elapses but no other event happens, then the rate needs to be increased and the procedure mentioned above is repeated.

When the transmission power has passed the threshold 3 from a lower value to a higher value because of increasing the rate, an event type 3 is triggered, and then the state of the rate adjustment controller is determined (S221). If the rate adjustment controller is at an increasing rate state, then the rate adjustment controller is set to the normal state (S223) and the timer is shut (S224) showing that it is unnecessary to take any adjustment or to trace the rate. If the rate adjustment controller is at the normal state, no any processing is needed (S222).

The above description is for the situation that there are four thresholds and uplink transmission rate is adjusted according to transmission power of the mobile station. Of course, the method also can be used for situation that the downlink transmission rate is adjusted according to transmission power of the base station. It is obvious that when the cell is at an un-advantageous state, such as the heavy load etc., the method will decrease the rate to prevent the QoS from getting worse, and when the cell is at a good state, such as a low load etc., the method will increase the rate to have a better QoS. In addition, the rate adjustment can be reflected on the transmission power, so it can suppress the transmission power getting higher and higher to prevent the communication environment from getting worse.

It is understood for those skilled in the art that the above-mentioned embodiment may have different modifications, for example, there may be one, two or more than four thresholds.

Figure 4:
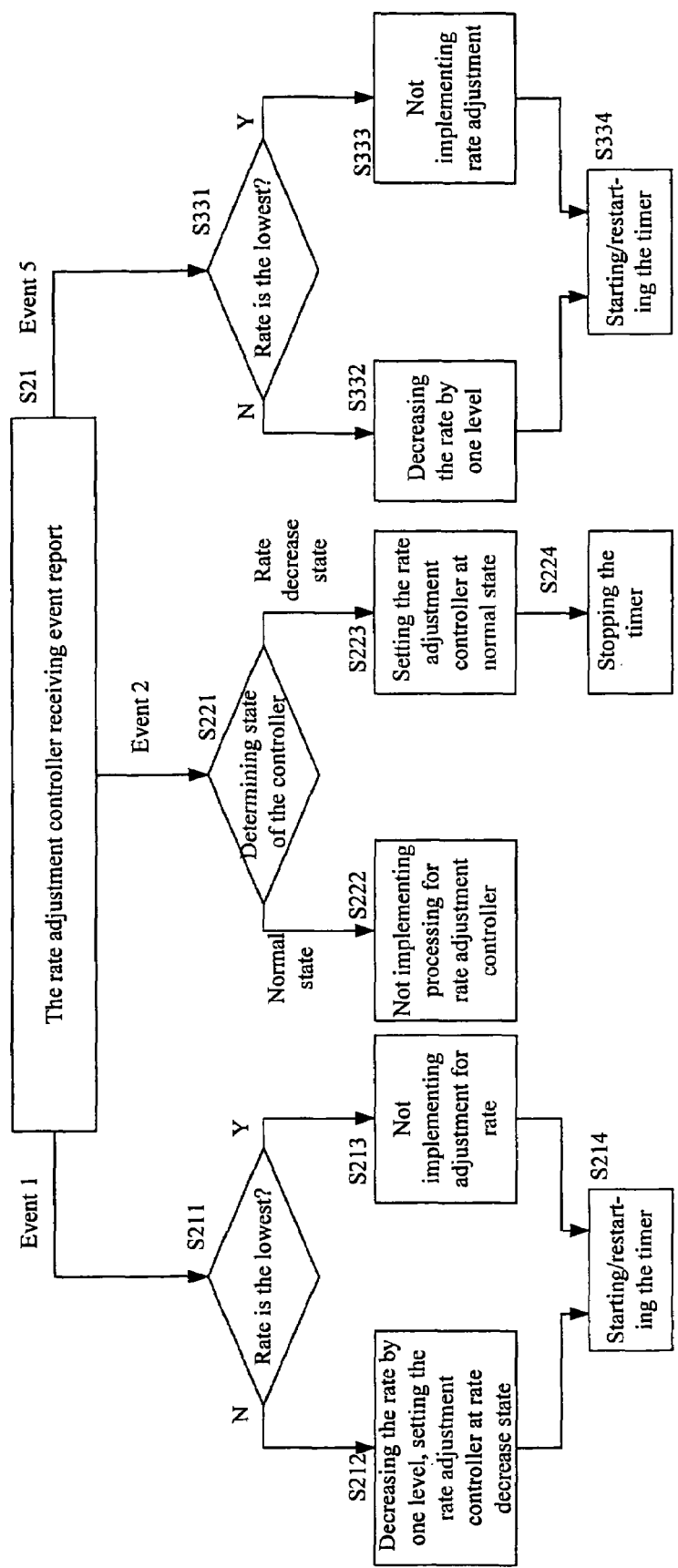
FIG. 4 shows a flowchart of rate adjustment implemented by the rate adjustment controller in a two thresholds condition.
Figure 5:
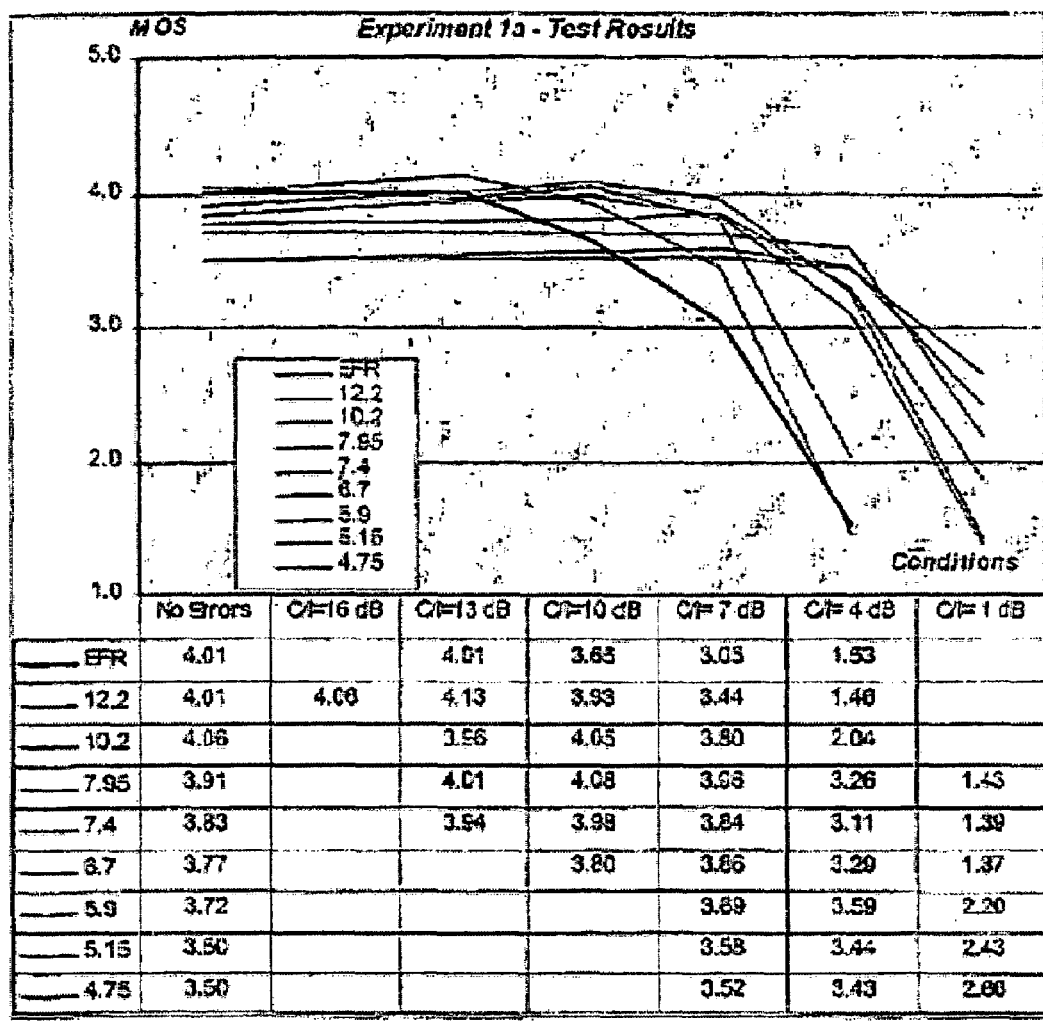
FIG. 5 shows curves of MOS to C/I for different AMR modes.

In FIG. 4, only threshold 1 and threshold 2 are remained, so there are three event types: the event type 1, the transmission power goes through the threshold 1 upwards, and when this event type is triggered, the rate needs to be decreased; the event type 2, the transmission power goes through the threshold 2 downwards, and when this event type is triggered, no any rate adjustment is needed; the event type 5, a set time in the timer elapses. The control steps done by the rate adjustment controller are similar to those shown in FIG. 3. One of the differences is as follow: when event type 2 is triggered, the state of the rate adjustment controller is determined in step S221; if it is a normal state, no any processing will be done (S222); if it is in a rate decrease state, the rate adjustment controller will be set to a normal state (S223) and the timer will be started/restarted (S224). Here, the rate adjustment controller is at a rate increase state is discarded, since there are only two threshold showing only a rate decrease state or a normal state. Similarly, another difference is as follow: when event type 5 has happened, whether the rate is at the lowest level is determined (S331); if so, no any rate adjustment is needed (S333) and the timer is started/restarted (S334); if not, the rate is decreased by one level lower (S332) and the timer is started/restarted.

In other hand, the highest threshold 1 and the lowest threshold 4 can be set, and the original threshold 2 is merged with the original threshold 1, meanwhile the original threshold 3 is merged with the original threshold 4 so that two thresholds are remained. In this case, there are five event types in total: the event type 1, the transmission power goes through threshold 1 upwards, and rate decrease is needed; the event type 2, the transmission power goes through threshold 1 upwards, and no any rate adjustment is needed; the event type 3, the transmission power goes through threshold 4 downwards, and no any rate adjustment is needed; the event type 4, the transmission power goes through threshold 4 downwards, and rate increase is needed; the event type 5, the set time elapses. Obviously, in this case the area between threshold 1 and threshold 2 is considered a normal state area and no any rate adjustment is needed. The adjustment procedure of the transmission rate for this situation is described in FIG. 3, and the detail description is omitted.

The method of the invention can be used in one threshold situation that remains the threshold 1 and merges the original threshold 2 with the threshold 1. In this case, there are three event types to be triggered: the event type 1, the transmission power goes through threshold 1 upwards and the rate needs to be decreased; the event type 2, the transmission power goes through threshold 1 downwards and no any rate adjustment is needed; the event type 5, the set time elapses. The adjustment procedure of the transmission power for this situation is described in FIG. 4.

Of course, the method of the invention can be used in a three thresholds situation that remains threshold 1, either of threshold 2 and threshold 3, and threshold 4. The adjustment procedure can be seen in FIG. 2. The method can be used in more than four thresholds situation, The amplitude of each level of rate may be changed based on different applications. In summary, the key point of the invention is to adjust the transmission rate according to change of the transmission power.

The invention also provides an apparatus that controls the uplink and/or downlink rate between a mobile station and a base station according to the transmission power of the mobile station/base station. The apparatus includes a transmission power measurement device in the mobile station/base station. The transmission power measurement device is used to measure the transmission power of the mobile station/base station, and to compare them with the predefined thresholds to determine whether an event happens. The apparatus also includes a rate adjustment controller in a base station controller. The rate adjustment controller is used to receive report from the transmission power measurement device when the transmission power measure device determines an event has happened, and to send a rate adjustment demand to the mobile station/base station to adjust the uplink/downlink rate based on the event type. The apparatus may also include a timer in the base station controller; when the timer expires, an event happens and is reported to the rate adjustment controller. The detail procedure has been described before.

The method and apparatus of the invention can work without the timer. In this case, when the transmission rate is adjusted according to the transmission power, the rate is increased or decreased according to only the situation that the transmission power has passed the threshold. Once the transmission power goes through the lowest or highest threshold with a certain direction, the rate will be adjusted once with one or more than one levels. In this way, when the communication condition goes worse, the deterioration of QoS is retarded and the increase of transmission power is suppressed; when the communication condition goes better, the QoS is improved.

Advantages of the method and apparatus of the invention are as follows.

(1) With the rate control method of the invention, when a CDMA mobile communication system has a heavy load, the QoS can be improved and increase of transmission power can be effectively suppressed at the same time. So, the load of the system is reduced, the system is more stable, and the capacity of the system is increased.

(2) With the date rate control method of the invention, the uplink and downlink rate can be adjusted separately and asymmetrically, so resource can be allocated to the uplink and downlink differently based on the different requirement.

(3) With the rate control method of the invention, information for the rate adjustment comes from measurement of the transmission power. Due to the power control, the rate adjustment rapidly reflects the cell load, channel condition and environment change. In this way, balance processing can be implemented for the condition with overload and low QoS rapidly.

(4) With the rate control method of the invention, during rate adjustment, four or more than four thresholds can be set for the transmission power and every threshold triggers different event type; so the rate adjustment policy for each event type can be different to make the rate adjustment more accurate.

(5) With the rate control method of the invention, during rate adjustment, each time the rate may be increased or decreased by one level, so the transmission power and the cell load do not change suddenly. In this way, the system can be work stably, and the QoS can be improved.

(6) With the rate control method of the invention, during rate adjustment, when adjustment effect of one time is not obvious, the rate adjustment can be done several times by setting a time in the timer. In this way, the effect of rate adjustment can be ensured, that is, the load can be lowered effectively, the QoS can be ensured and disadvantageous change of transmission environment can be compensated.

While the present invention has been described with respect to a preferred embodiment, those skilled in the art will appreciate numerous modifications and variations therefrom. It is intended that the appended claims cover all such modification and variations as fall within the true spirit and scope of the present invention.

The invention claimed is:

1. A method for controlling uplink and/or downlink transmission rate between a mobile station and a base station according to transmission power of the mobile station/base station in a communication system, comprising:

a transmission power measurement device in the mobile station and/or the base station measuring the transmission power;

comparing the measured transmission power with predefined thresholds to determine whether an event happens; and if an event happens, reporting an event type to a rate adjustment controller at a network side, wherein the event type indicates that the measured transmission power exceeds at least one threshold or falls below at least one threshold;

sending, by the rate adjustment controller, a rate adjustment demand according to the event type; and starting, by the rate adjustment controller, a timer in the rate adjustment controller;

receiving, by the mobile station and/or the base station, the rate adjustment demand and adjusting the transmission rate, wherein if the mobile station adjusts the transmission rate, the transmission rate adjusted by the mobile station is the uplink transmission rate, and if the base station adjusts the transmission rate, the transmission rate adjusted by the base station is the downlink transmission rate; and sending, by the rate adjustment controller, another rate adjustment demand to the mobile station and/or base station if the timer expires and no other event type is reported.

2. The method according to claim 1, wherein the predefined thresholds are set according to load of the communication system, channel condition and distance between the mobile station and the base station.

3. The method according to claim 2, wherein the predefined thresholds at least comprises a highest transmission power threshold representing the condition that the system is overload, the channel becomes bad and the mobile station is at boundary of coverage area of the base station.

4. The method according to claim 3, wherein the predefined thresholds further comprises one or more than one normal transmission power thresholds representing the conditions that all of the system load, channel quality and distance between the mobile station and the base station are normal.

5. The method according to claim 4, wherein the predefined thresholds further comprises a lowest transmission power threshold representing the condition that the system load is very light, the channel quality is very good and the mobile station is near the base station.

6. The method according to claim 5, wherein the sending a rate adjustment demand according to the event type comprises: if the event type indicates that the measured transmission power increases until it exceeds the highest threshold,
   determining whether the transmission rate is the lowest;
   if the transmission rate is not the lowest, sending the rate adjustment demand which indicates decreasing the transmission rate by one level, setting the rate adjustment controller at rate decrease state, and starting/restarting the timer;
   if the transmission rate is the lowest, sending the rate adjustment demand which indicates not implementing adjustment for the transmission rate, and starting/restarting the timer.

7. The method according to claim 6, wherein the sending the rate adjustment demand according to the event type further comprises: if the event type indicates that the measured transmission power decreases until it falls below the lowest threshold,
   determining whether the transmission rate is the highest;
   if the transmission rate is not the highest, sending the rate adjustment demand which indicates increasing the transmission rate by one level, setting the rate adjustment controller at rate increase state, and starting/restarting the timer;
   if the transmission rate is the highest, sending the rate adjustment demand which indicates not implementing adjustment for transmission rate, and starting/restarting the timer.

8. The method according to claim 7, wherein the sending the rate adjustment demand according to the event type further comprises: if the event type indicates that the measured transmission power decreases until fails below the normal threshold or increases until it exceeds the normal threshold, then
   determining the state of the rate adjustment controller;
   if the rate adjustment controller is at normal state, sending the rate adjustment demand which indicates not implementing adjustment for rate adjustment controller;
   if the rate adjustment controller is at rate increase state or rate decrease state, sending the rate adjustment demand which indicates setting the rate adjustment controller at normal state, and stopping the timer.

9. The method according to claim 8, wherein the sending a rate adjustment demand according to the event type further comprises: if the event type indicates expiration of the timer,
   determining whether the transmission rate is the highest or lowest;
   if the transmission rate is neither the highest nor the lowest, determining state of the rate adjustment controller;
   if the rate adjustment controller is at data rate decrease state, sending the rate adjustment demand which indicates decreasing the transmission rate by one level and starting/restarting the timer;
   if the rate adjustment controller is at rate increase state, sending the rate adjustment demand which indicates increasing the transmission rate by one level and starting/restarting the timer;
   if the transmission rate is the highest or lowest, sending the rate adjustment demand which indicates not implementing adjustment for the transmission rate, and starting/restarting the timer.

10. The method according to claim 4, wherein the sending a rate adjustment demand according to the event type comprises: if the event type indicates that the measured transmission power increases until it exceeds the highest threshold,
    determining whether the transmission rate is the lowest;
    if the transmission rate is not the lowest, sending the rate adjustment demand which indicates decreasing the transmission rate by one level, setting the rate adjustment controller at rate decrease state, and starting/restarting the timer;
    if the transmission rate is the lowest, sending the rate adjustment demand which indicates not implementing adjustment for transmission rate, and starting/restarting the timer.

11. The method according to claim 10, wherein the sending a rate adjustment demand according to the event type further comprises: if the event type indicates that the measured transmission power increases until it exceeds the normal threshold,
    determining the state of the rate adjustment controller;
    if the rate adjustment controller is at normal state, sending the rate adjustment demand which indicates not implementing adjustment for rate adjustment controller;
    if the rate adjustment controller is at rate decrease state, sending the rate adjustment demand which indicates setting the rate adjustment controller at normal state, and stopping the timer.

12. The method according to claim 11, wherein the sending a rate adjustment demand according to the event type further comprises: if the event type indicates the expiration of the timer,
    determining whether the transmission rate is the lowest;
    if the transmission rate is not the lowest, sending the rate adjustment demand which indicates decreasing the transmission rate by one level and starting/restarting the timer;
    if the transmission rate is the lowest, sending the rate adjustment demand which indicates not implementing adjustment for the transmission rate, and starting/restarting the timer.

13. An apparatus for controlling uplink and/or downlink transmission rate between a mobile station and a base station according to transmission power of the mobile station/base station in a communication system, comprising:
    a transmission power measurement device in the mobile station and/or base station, for measuring transmission power of the mobile station/base station and comparing the measured transmission power with predefined thresholds to determine whether an event happens, and if an event happens, reporting an event type which indicates that the measured transmission power exceeds at least one threshold or falls below at least one threshold; and
    a rate adjustment controller in a network side, for receiving the event type from the transmission power measurement device and sending a rate adjustment demands to the mobile station and/or base station according to the event type to adjust the uplink and/or downlink transmission rate; wherein the rate adjustment controller further comprises a timer; and the rate adjustment controller is further configured to send another rate adjustment demand to the mobile station and/or base station if the timer expires and no other event type is reported.

14. The apparatus according to claim 13, wherein the predefined thresholds are set according to load of the communication system, channel condition and distance between the mobile station and the base station.

15. The apparatus according to claim 14, wherein the predefined thresholds at least comprises a highest transmission power threshold representing the condition that the system is overload, the channel becomes bad and the mobile station is at boundary of coverage area of the base station.

16. The apparatus according to claim 15, wherein the predefined thresholds further comprises one or more than one normal transmission power thresholds representing the conditions that all of the system load, channel quality and distance between the mobile station and the base station are normal.

17. The apparatus according to claim 16, wherein the predefined thresholds further comprises a lowest transmission power threshold representing the condition that the system load is very light, the channel quality is very good and the mobile station is near the base station.

18. The apparatus according to claim 17, wherein the rate adjustment controller is further configured to determine whether the uplink and/or downlink transmission rate is the lowest if the event type indicates that the measured transmission power increases until it exceeds the highest threshold; and the rate adjustment controller is further configured to send the rate adjustment demand which indicates decreasing the transmission rate by one level, set itself at rate decrease state and start/restart the timer if the transmission rate is not the lowest; or configured to send the rate adjustment demand which indicates not implementing adjustment for transmission rate and start/restart the timer if the transmission rate is the lowest.

19. The apparatus according to claim 18, wherein the rate adjustment controller is further configured to determine whether the uplink and/or downlink transmission rate is the highest if the event type indicates that the measured transmission power decreases until it falls below the lowest threshold; and the rate adjustment controller is further configured to send the rate adjustment demand which indicates increasing the transmission rate by one level, set itself at rate increase state, and start/restart the timer if the transmission rate is not the highest; or configured to send the rate adjustment demand which indicates not implementing adjustment for transmission rate and start/restart the timer if the transmission rate is the highest.

20. The apparatus according to claim 19, wherein the rate adjustment controller is further configured to determine the state of itself if the event type indicates that the measured transmission power decreases until it falls below the normal threshold or increases until it exceeds the normal threshold; and the rate adjustment controller is further configured to not implement adjustment for itself if the rate adjustment controller is at a normal state; or configured to set itself at normal state and shut the timer if the rate adjustment controller is at a rate increase state or a rate decrease state.

21. The apparatus according to claim 20, wherein the rate adjustment controller is further configured to determine whether the transmission rate is the highest or lowest if the event type indicates the expiration of the timer; and the rate adjustment controller is further configured to determine the state of itself if the transmission rate is neither the highest nor the lowest; and configured to decrease the transmission rate by one level and start/restart the timer if the rate adjustment controller is at a rate decrease state, or increase the transmission rate by one level and start/restart the timer if the rate adjustment controller is at a rate increase state;

if the transmission rate is the highest or lowest, the rate adjustment controller is further configured to not implement adjustment for the transmission rate, and start/restart the timer.

22. The apparatus according to claim 16, wherein the rate adjustment controller is further configured to determine whether the uplink and/or downlink transmission rate is the lowest if the event type indicates that the measured transmission power increases until it exceeds the highest threshold; and the rate adjustment controller is further configured to decrease the transmission rate by one level, set itself at rate decrease state, and start/restart the timer if the transmission rate is not the lowest; or configured to not implement adjustment for the transmission rate and start/restart the timer if the transmission rate is the lowest.

23. The apparatus according to claim 22, wherein the rate adjustment controller is further configured to determine the state of itself if the event type indicates that the measured transmission power increase until it exceeds the normal threshold; and the rate adjustment controller is further configured to not implement adjustment for the rate adjustment controller if the rate adjustment controller is at a normal state; or configured to set itself at normal state and shut the timer if the rate adjustment controller is at a rate decrease state.

24. The apparatus according to claim 23, wherein the rate adjustment controller is further configured to determine whether the transmission rate is the lowest if the event type indicates expiration of the timer; and the rate adjustment controller is further configured to decrease the transmission rate by one level and start/restart the timer if the transmission rate is not the lowest; or configured to not implement adjustment for the transmission rate and start/restart the timer if the transmission rate is the lowest.

* * * * *